US011492421B2

(12) United States Patent
Chintakunta et al.

(10) Patent No.: US 11,492,421 B2
(45) Date of Patent: Nov. 8, 2022

(54) PROCESS FOR THE PREPARATION OF DALTEPARIN SODIUM

(71) Applicant: Biological E Limited, Telangana (IN)

(72) Inventors: Vamsee Krishna Chintakunta, Hyderabad (IN); Manohar Sarma Vedula, Hyderabad (IN); Narender Dev Mantena, Hyderabad (IN); Rajasekhar Kadaboina, Telangana (IN)

(73) Assignee: Biological E Limited

( * ) Notice: Subject to any disclaimer, the term of this patent is extended or adjusted under 35 U.S.C. 154(b) by 99 days.

(21) Appl. No.: 16/968,201

(22) PCT Filed: Feb. 14, 2019

(86) PCT No.: PCT/IB2019/051192
§ 371 (c)(1),
(2) Date: Aug. 7, 2020

(87) PCT Pub. No.: WO2019/159092
PCT Pub. Date: Aug. 22, 2019

(65) Prior Publication Data
US 2021/0040239 A1 Feb. 11, 2021

(30) Foreign Application Priority Data
Feb. 14, 2018 (IN) .............................. 201841005592

(51) Int. Cl.
*C08B 37/00* (2006.01)
*B01J 19/12* (2006.01)

(52) U.S. Cl.
CPC ......... *C08B 37/0078* (2013.01); *B01J 19/123* (2013.01); *B01J 2219/1203* (2013.01)

(58) Field of Classification Search
CPC ................. C08B 37/0078; B01J 19/123; B01J 2219/1203
See application file for complete search history.

(56) References Cited

U.S. PATENT DOCUMENTS

| | | | |
|---|---|---|---|
| 4,303,651 A | 12/1981 | Lindahl et al. | |
| 4,500,519 A | 2/1985 | Lormeau et al. | |
| 5,019,649 A | 5/1991 | Lormeau et al. | |
| 5,599,801 A * | 2/1997 | Branellec | A61P 7/02 514/56 |

(Continued)

FOREIGN PATENT DOCUMENTS

| | | | | |
|---|---|---|---|---|
| CN | 101942038 | * | 1/2011 | ............ C08B 37/10 |
| CN | 102558393 | | 7/2012 | |
| CN | 103232558 | | 8/2013 | |

(Continued)

OTHER PUBLICATIONS

Ozug et al., "Structural elucidation of the tetrasaccharide pool in enoxaparin sodium" Anal Bioanal Chem vol. 403 vol. 2 pp. 2733-2744 DOI 10.1007/S00216-012-6045-0 (Year: 2012).*

(Continued)

*Primary Examiner* — Eric Olson
(74) *Attorney, Agent, or Firm* — Perkins Coie LLP

(57) ABSTRACT

The present invention provides an improved process for the preparation of Dalteparin sodium. The process is simple, commercially viable and industrially advantageous.

11 Claims, 1 Drawing Sheet

(56) References Cited

U.S. PATENT DOCUMENTS

2008/0318328 A1   12/2008   Viskov et al.

FOREIGN PATENT DOCUMENTS

| | | |
|---|---|---|
| CN | 104045743 | 9/2014 |
| CN | 104045744 | 9/2014 |
| CN | 104086673 | 10/2014 |
| CN | 104098716 | 10/2014 |
| CN | 105440160 | 3/2016 |
| CN | 105884934 | 8/2016 |
| CN | 106317258 | 1/2017 |
| CN | 106699929 | 5/2017 |
| CN | 106986954 | 7/2017 |
| CN | 107141373 | 9/2017 |
| CN | 107236057 | 10/2017 |
| EP | 0014184 | 8/1980 |
| EP | 0076279 | 4/1983 |
| EP | 1773890 | 4/2007 |
| WO | WO 80/01383 | 7/1980 |

OTHER PUBLICATIONS

"Low Molecular Weight Heparins: Review of the Comparative Effectiveness for Various Indications" Health Technology Inquiry Service pp. 1-17 (Year: 2009).*

White, "Low-Molecular-Weight Heparins: Are They All the Same?" British Journal of Haematology, vol. 121, pp. 12-20 (Year: 2003).*

English machine translation of CN 101942038, downloaded from worldwide.espacenet.org (Year: 2011).*

English machine translation of CN 106317258, downloaded form worldwide.espacenet.org (Year: 2017).*

Gray et al., "Heparin and low-molecular-weight heparin" Thromb Haemost vol. 99 pp. 807-818 doi:10.1160/TH08-01-0032 (Year: 2008).*

International Search Report and Written Opinion dated Jun. 24, 2019 for International Application No. PCT/IB2019/051192.

* cited by examiner

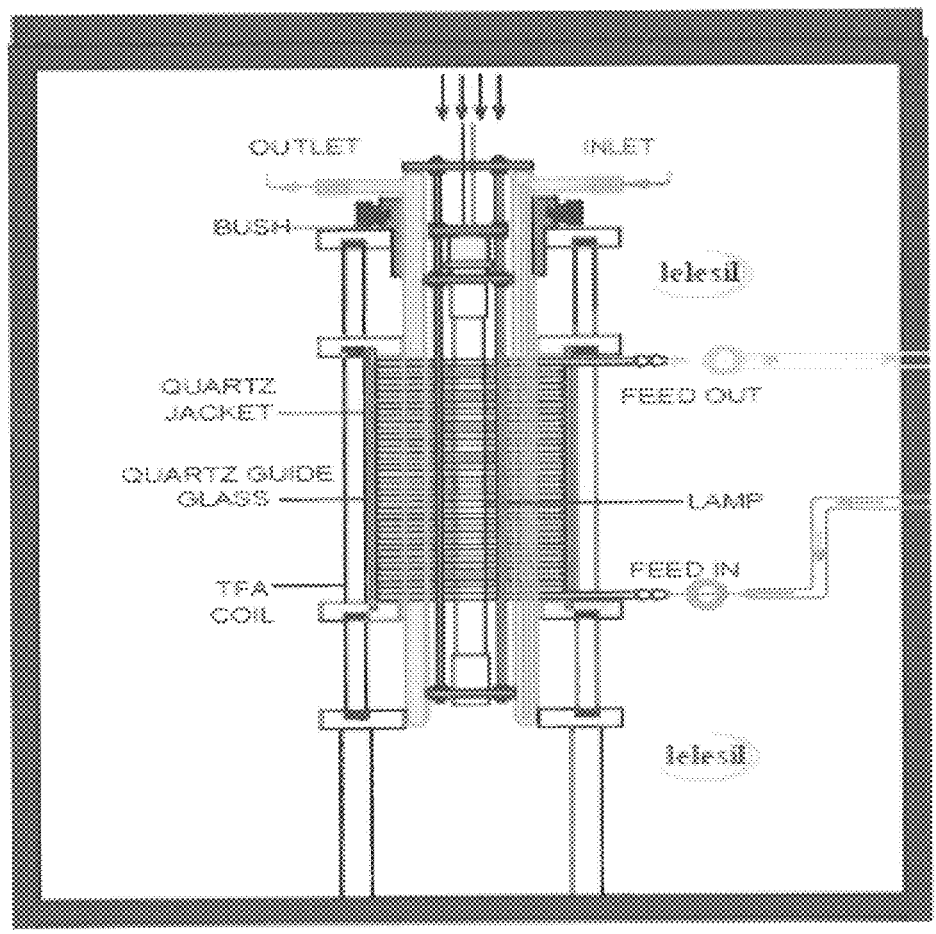

PROCESS FOR THE PREPARATION OF DALTEPARIN SODIUM

CROSS-REFERENCE TO RELATED APPLICATION

This application is a 371 U.S. National Stage application of International Application No. PCT/IB2019/051192, filed on Feb. 14, 2019, which claims the benefit of priority to Indian Provisional Patent Application No. 201841005592, filed on Feb. 14, 2018, their entire contents are incorporated herein by reference in their entireties.

TECHNICAL FIELD

The present invention relates to an improved process for the preparation of Dalteparin sodium.

BACKGROUND

Anticoagulants, commonly referred to as "blood thinners" are serving as the mainstay therapy for the prevention and treatment of acute arterial and venous thrombotic disorders. Unfractioned heparin and low-molecular-weight heparins (LMWHs) are used as anticoagulants exclusively for long-term therapy as they are efficacious, safe and more convenient. Each commercially available LMWH is prepared from unique chemical or enzymatic depolymerization of mucosal heparin.

Dalteparin sodium is one such LMWH and a potent anticoagulant that acts through indirect inhibition of thrombin, the key procoagulant that converts fibrinogen to fibrin. Dalteparin sodium is marketed under the brand name Fragmin®.

Dalteparin sodium is produced through controlled nitrous acid depolymerization of heparin sodium from porcine intestinal mucosa followed by a chromatographic purification process and contains:

- 2-O-sulfo-α-L-idopyranosuronic acid at the non-reducing end and a 6-O-sulfo-2,5-anhydro-D-mannitol at the reducing end of their chain,
- mass-average relative molecular mass ranges between 5600 and 6400 daltons (Da), with a characteristic value of about 6000 Da,
- degree of sulfation is 2.0 to 2.5 per disaccharide unit,
- an anti-factor Xa of not less than 110 IU/mg and not more than 210 IU/mg,
- an anti-factor IIa of not less than 35 IU/mg and not more than 100 IU/mg and
- the ratio of anti-factor Xa activity to anti-factor IIa activity is between 1.9 and 3.2.

Dalteparin sodium is structurally represented as shown below:

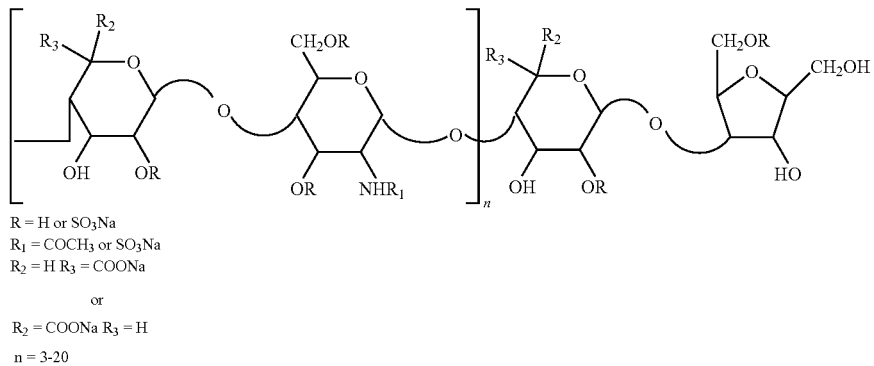

R = H or SO$_3$Na
R$_1$ = COCH$_3$ or SO$_3$Na
R$_2$ = H R$_3$ = COONa
or
R$_2$ = COONa R$_3$ = H
n = 3-20

Dalteparin sodium, was first disclosed in WO 80/01383 and U.S. Pat. No. 4,303,651 and is prepared by depolymerization of heparin sodium with nitrous acid or by periodate oxidation followed by sodium borohydride reduction. The use of nitrous acid and sodium borohydride generates nitrite (NO$_2$—), N-nitroso (N—NO) compounds and elemental boron as impurities in the final product. The European pharmacopoeial (Ph. Eur) requirements for permissible limits of nitrite and boron are quite stringent, the limits for N—NO content even though not specified in the Ph. Eur monograph, one needs to control this impurity as it has a structural alert for potential genotoxic impurity. The manufacture of Dalteparin sodium on an industrial scale involves the handling of large amounts of these reagents, hence it is required to control these impurities in order to maintain the quality of Dalteparin sodium as well as to satisfy the regulatory requirements.

| Ph. Eur Limits of impurities | | |
|---|---|---|
| NO$_2^-$ (ppm) | N—NO (ppm) | Boron (ppm) |
| 5 | Not specified | 1 |

Several processes for the preparation of Dalteparin sodium using varied depolymerisation, reduction, isolation and purification procedures to meet the Pharmacopoeial requirements are known. For example, depolymerizing heparin sodium with nitrous acid in an aqueous medium (U.S. Pat. No. 4,500,519); controlled depolymerization of heparin followed by alcohol precipitation or purification (U.S. Pat. No. 5,019,649, EP 0 014 184 and EP 0 076 279); controlled depolymerization of heparin followed by heat or microwave treatment (EP 1 773 890 B1); preparation of LMWH with a reduced content of glycoserine by oxidation of heparin using permanganate salt (US 2008/0318328). Further there are some Chinese patents or patent applications, for example, such as CN 101942038 B; CN 102558393 B; CN 103232558 A; CN 101942038 A; CN 102558393 A; CN 104045743 A; CN 104045744 A; CN 104098716 A; CN 105884934 A; CN 105440160 A; CN 106317258 A; CN 106699929 A; CN 106986954 A; CN 107141373 A; CN 107236057 A, that disclosed Dalteparin sodium preparation processes varying particularly in purification technology.

The prior art methods involve utilization of higher quantities of sodium nitrite, and sodium borohydride which warrant additional steps and/or chromatographic purification to remove the impurities generated on account of these reagents. Further, the literature procedures utilize higher temperatures during the depolymerisation and prolonged exposure (such as 20-30 min) to UV irradiation or employ heat or microwave treatment to control the N—NO groups which may not be viable during manufacturing and may affect the yields and quality of the final product.

Furthermore, UV irradiation with a high-power lamp for a prolonged duration or with UV wavelength less than 254 nanometre (nm) leads to generation of heat, ozone gas and consequently imparts color to the product.

The applicants found that UV reaction performed by exposing/inserting the UV lamp into the product solution for more than 10 min shows reduction in N—NO content in small scale, but not reproducible on a higher scale.

Hence, there is a need for an improved process for the preparation of Dalteparin sodium which overcomes one or more of the disadvantages of the prior art process(es). Further, a system and/or apparatus may be required to address the issue of color of the product and to have a control on the N—NO content when performed at a commercial scale.

SUMMARY

The present invention provides an improved process for the preparation of Dalteparin sodium, comprising the steps of:
(a) depolymerizing heparin sodium with sodium nitrite of 2.5 to 3.5% by weight in the presence of an acid,
(b) reducing the product obtained in step (a) with ≤2.0 mole equivalents of a reducing agent to obtain crude Dalteparin sodium,
(c) isolating the crude Dalteparin sodium obtained in step (b),
(d) stirring the crude product obtained in step (c) in a solvent mixture to obtain precipitate of Dalteparin sodium,
(e) dissolving the precipitate obtained in step (d) in water and subjecting to ultra-violet irradiation at 254 nm wavelength and 4 to 40 W power for a time period of 10 seconds to 8 minutes and
(f) lyophilizing the solution obtained in step (e) in presence of alcohol to obtain Dalteparin sodium in free powder form.

This improved process is efficient, cost effective and industrially feasible for the preparation of Dalteparin sodium. Further, the present invention provides an improved process for the preparation of Dalteparin sodium having nitrite ($NO_2$—), N—NO and boron impurities below the limits set by the pharmacopoeial standards.

BRIEF DESCRIPTION OF THE DRAWINGS

FIG. 1 is an illustration of a photochemical reactor used in the present process.

DETAILED DESCRIPTION

Before the methods of the present disclosure are described in greater detail, it is to be understood that the methods are not limited to particular embodiments described, as such may, of course, vary. It is also to be understood that the terminology used herein is for the purpose of describing particular embodiments only, and is not intended to be limiting, since the scope of the methods will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the methods. The upper and lower limits of these smaller ranges may independently be included in the smaller ranges and are also encompassed within the methods, subject to any specifically excluded limit in the stated range. Where the stated range includes one or both of the limits, ranges excluding either or both of those included limits are also included in the methods.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

The term "comprising" or "comprises" is used in reference to compositions, methods, and respective component (s) thereof, that are essential to the invention, yet open to the inclusion of unspecified elements, whether essential or not.

The term "reactor" is used in reference to a system, model, apparatus or equipment.

In an embodiment, the present invention provides an improved process for the preparation of Dalteparin sodium, more specifically, Dalteparin sodium having nitrite ($NO_2$), N—NO and boron impurities below the limits set by the pharmacopoeial standards.

The present invention provides an improved process for the preparation of Dalteparin sodium, comprising the steps of:
(a) depolymerizing heparin sodium with sodium nitrite of 2.5 to 3.5% by weight in the presence of an acid,
(b) reducing the product obtained in step (a) with ≤2.0 mole equivalents of a reducing agent to obtain crude Dalteparin sodium,
(c) isolating the crude Dalteparin sodium obtained in step (b),
(d) stirring the crude product obtained in step (c) in a solvent mixture to obtain precipitate of Dalteparin sodium,
(e) dissolving the precipitate obtained in step (d) in water and subjecting to ultra-violet irradiation at 254 nm wavelength and 4 to 40 W power for a time period of 10 seconds to 8 minutes and
(f) lyophilizing the solution obtained in step (e) in presence of alcohol to obtain Dalteparin sodium in free powder form.

It has been found that by carrying out the foregoing process in the recited order, the Dalteparin sodium so obtained met the Pharmacopoeial and quality requirement in terms of molecular weight distribution, $NO_2$— ion content, N—NO content and boron content.

The heparin sodium is depolymerized using nitrous acid. The nitrous acid can be added directly or, alternatively, it can be generated in situ using controlled amounts of an acid and a derivative of nitrous acid. Suitable acids may be selected from hydrochloric acid, acetic acid, sulphuric acid and, more preferably, hydrochloric acid. Suitable derivatives of nitrous acid may be a salt, an ether-salt or, more preferably, an alkali or alkaline-earth salt. In a preferred embodiment, a salt of nitrous acid, a water-soluble salt, more preferably, an alkali salt, such as sodium nitrite ($NaNO_2$), is used. During the depolymerization, the nitrite reacts with N-sulfate group in heparin to form an unstable N-nitroso compound as an intermediate which then cyclizes intramolecularly to form 2,5-anhydro-D-mannose.

The depolymerization of heparin sodium solution is performed in the presence of 2.5% to 3.5% sodium nitrite by weight relative to the heparin sodium, preferably 2.5% to 3.1%, at a temperature in the range of 5 to 35° C. preferably at a temperature of 5° C. and 15° C. The depolymerization step is performed at a pH in the range of 2.0 to 4.0 by using hydrochloric acid. The use of sodium nitrite in optimal quantities is critical. The amount of sodium nitrite lesser than 2.5% may result in incomplete depolymerization and an amount of sodium nitrite greater than 3.5%, may result in excess depolymerization. The product obtained in either of these processes may not meet the compendial requirements of average molecular weight and distribution.

The depolymerized heparin having an aldehyde group of 2,5-anhydro-D-mannose at its reducing terminal is reduced to 2,5-anhydro-D-mannitol. The reduction according to the present invention is carried out using a reducing agent, such as sodium, potassium or lithium borohydride. In a preferred embodiment, reducing agent is sodium borohydride. The amount of sodium borohydride used for reduction is ≤2.0 mole equivalents to the weight of heparin sodium. The reduction is carried at room temperature for a period of about 1.0 to 3.0 hours and, more preferably, for a period of about 1 hour. The optimal quantity of sodium borohydride is helpful in restricting the boron impurity at lower levels and helps in minimizing the purification steps.

Then, according to step (c), the isolation of the crude Dalteparin sodium is carried out by dissolving the product obtained in step (b) in water at a temperature in the range of 5 to 35° C., followed by adding sodium chloride. After this, in step (d), the crude Dalteparin sodium is stirred in a solvent mixture comprising water and alcohol and filtered to obtain a precipitate of Dalteparin sodium. The alcohol used is selected from methanol, ethanol, isopropanol and the like.

In yet another embodiment, the present invention provides an efficient removal of N—NO content according to step (e), which comprises subjecting a solution of Dalteparin sodium prepared by dissolving Dalteparin sodium precipitate obtained above in water to ultra-violet irradiation. The irradiation time depends on the irradiation system used, the power of the radiation and the amount of N—NO content to be removed in the product solution. Preferably, the ultra-violet irradiation system is equipped with a 4-40 W lamp, and the Dalteparin solution is exposed to UV radiation at 254 nm for a period of 10 seconds to 8 minutes. As a UV irradiation system, it is possible to envisage either a closed or open type apparatus enabling exposure of a solution of Dalteparin sodium to the UV radiation source.

In certain embodiments, the UV irradiation may be carried out in any photochemical reactor provided with one or more UV lamps (e.g, UV photochemical reactor). In certain embodiments, the photochemical reactor may be a continuous photochemical reactor integrated with one or more UV lamps. In a further embodiment, any UV photochemical reactor known in the art may be used. In yet further embodiments, the photochemical reactor is composed of a UV lamp around which a quartz sheath is fitted. The solution containing the Dalteparin sodium circulate around the UV lamp protected by the quartz sheath. An illustrative example of a photochemical reactor used in the present process is shown in FIG. 1.

In another embodiment, the present process according to step (f) comprises lyophilization step. The lyophilization step comprises adding alcohol to the solution obtained in step (e) to obtain Dalteparin sodium in free powder form. The lyophilization is carried out using the procedures known in the art. The alcohol is selected from a group comprising methanol, ethanol, isopropanol and the like. In certain embodiments, the lyophilization is carried out using alcohol at a concentration of 5 to 15% by volume relative to the water used in step (e). If water alone is used as described in the prior art, it yields Dalteparin sodium as a cake with residual moisture. The hardness of the cake varies with changes in the lyophilization parameters and a powder processing step like milling is required to yield a free-flowing powder. Whereas, the Dalteparin sodium prepared according to the present invention having good texture, improved stability and low organic volatile impurity (OVI) content.

In a preferred embodiment, the present invention provides an improved process for the preparation of Dalteparin sodium, which comprises the steps of:
(a) depolymerizing heparin sodium with sodium nitrite of 2.5 to 3.5% by weight in the presence of an acid,
(b) reducing the product obtained in step (a) with ≤2 mole equivalents of sodium borohydride to obtain crude Dalteparin sodium,
(c) isolating the crude Dalteparin sodium obtained in step (b),
(d) stirring the crude product obtained in step (c) in a solvent mixture to obtain precipitate of Dalteparin sodium,
(e) dissolving the precipitate obtained in step (d) in water and subjecting to ultra-violet irradiation at 254 nm wavelength and 4 to 40 W power for a time period of 10 seconds to 8 minutes and
(f) lyophilizing the solution obtained in step (e) in presence of alcohol to obtain Dalteparin sodium in free powder form.

In yet another embodiment, the present invention provides an improved process for the preparation of Dalteparin sodium, which comprises the steps of:
(a) depolymerizing an aqueous solution of heparin sodium with aqueous sodium nitrite solution of 2.5 to 3.1% by weight relative to heparin sodium in the presence of aqueous hydrochloric acid at a pH of 2 to 4 and at a temperature of 5 to 10° C.,
(b) reducing the product obtained in step (a) with 1.5 to 2.0 equivalents of sodium borohydride to obtain crude Dalteparin sodium,
(c) isolating the crude Dalteparin sodium obtained in step (b),
(d) stirring the crude product obtained in step (c) in a solvent mixture to obtain precipitate of Dalteparin sodium,
(e) dissolving the precipitate of Dalteparin sodium obtained in step (d) in water and subjecting to ultra-violet irradiation at 254 nm wavelength and 4 to 40 W power for a time period of 10 seconds to 8 minutes and
(f) lyophilizing the solution obtained in step (e) in presence of alcohol to obtain Dalteparin sodium in free powder form.

In yet another embodiment, the present invention provides an improved process for the preparation of Dalteparin sodium comprising the steps of:
(a) depolymerizing an aqueous solution of heparin sodium with 2.5 to 3.1% aqueous sodium nitrite solution, in the presence of aqueous hydrochloric acid at a pH of 2 to 4 and at a temperature of 5 to 10° C.,
(b) reducing the product obtained in step (a) with 1.5 to 2.0 equivalents of sodium borohydride to obtain crude Dalteparin sodium,
(c) isolating the crude Dalteparin sodium obtained in step (b),
(d) stirring the crude product obtained in step (c) in a solvent mixture to obtain precipitate of Dalteparin sodium,
(e) dissolving the precipitate obtained in step (d) in water and subjecting to ultra-violet irradiation at 254 nm wavelength and 4 to 40 W power for a time period of 10 second to 8 minutes and
(f) lyophilizing the solution obtained in step (e) in presence of alcohol to obtain Dalteparin sodium in free powder form,
wherein the process does not involve any chromatographic purification step.

In certain embodiments, the process is a continuous process or a batch process. In a further embodiment, the process may be carried out in any photochemical reactor. Any photochemical reactor as described above may be used for the process.

The advantages of the present invention over the prior methods are:
1. Lower quantities of sodium nitrite,
2. Usage of optimal quantity of sodium borohydride, thereby avoiding the need of quenching and formation of lesser amounts of elemental boron,
3. Usage of Integrated continuous flow UV reactor for reproducibility, generating 254 nm wavelength light and shorter duration of UV irradiation, without heat for controlling the formation of color to Dalteparin sodium and
4. Product isolation by simple alcohol precipitation, rather than using time-consuming, expensive and cumbersome chromatographic techniques.
5. Usage of alcohol during lyophilization to obtain Dalteparin sodium as a free powder, thereby avoiding an additional milling step.

EXAMPLES

The following examples are provided to illustrate the invention and are merely for illustrative purpose only and should not be construed to limit the scope of the invention.

Comparative Example 1

Heparin sodium (5.0 g) was dissolved in purified water and the pH of the solution was adjusted to 2-4 with aq. hydrochloric acid at 5° C. to 10° C. Sodium nitrite solution (2.2%) was added to reaction mass and stirred. The pH was then adjusted to 8-10 with sodium hydroxide, followed by the addition of sodium borohydride (1.5 eq.) and the reaction mass was held for 16 h. Excess sodium borohydride was quenched with hydrochloric acid. The resulting mixture was neutralised with sodium hydroxide followed by saturation with sodium chloride. The product was stirred with methanol, precipitated, filtered and dried to yield crude Dalteparin sodium. The crude product was dissolved in purified water, saturated with sodium chloride and stirred with methanol to precipitate the product. The resultant precipitate was filtered and dried under vacuum to obtain Dalteparin sodium with molecular weight distribution profile failed to meet the pharmacopoeial requirements of weight average molecular weight (Table 1). Yield 2.84 g.

Comparative Example 2

Heparin sodium (10.0 g) was dissolved in purified water and the pH of the solution was adjusted to 2-4 with hydrochloric acid at 5° C. to 10° C. Sodium nitrite solution (3.5%) was added to the reaction mass and stirred. The pH was then adjusted to 8-10 with sodium hydroxide, followed by the addition of sodium borohydride (1.5 eq.) and the reaction mass was held for 16 h. Excess sodium borohydride was quenched with hydrochloric acid. The resulting mixture was neutralised with sodium hydroxide followed by saturation with sodium chloride. The product was stirred with methanol, precipitated, filtered and dried to yield crude Dalteparin sodium. The crude product was further processed by following the procedure described in example 1 to obtain Dalteparin sodium with molecular weight distribution profile which failed to meet the pharmacopoeial requirements of weight average molecular weight (Table 1). Yield: 3.4 g Example 3

Heparin sodium (80 g) was dissolved in purified water and the pH of the solution was adjusted to 2-4 with hydrochloric acid at 5° C. to 10° C. Sodium nitrite solution (2.8%) was added to the reaction mass and stirred. The pH was then adjusted to 8-10 with sodium hydroxide followed by the addition of sodium borohydride (4.23 eq.), the reaction mass held there for 16 h, and subjected to bleaching with 30% hydrogen peroxide. The excess sodium borohydride was quenched with hydrochloric acid. The resulting mixture was neutralised with sodium hydroxide followed by saturation with sodium chloride. The resulting mass was stirred with methanol, precipitated, filtered and dried to yield a precipitate of Dalteparin sodium. The precipitated product (29 g) was dissolved in purified water and the solution was exposed to UV light (4 W) at 254 nm for 5 minutes. The reaction mass was saturated with sodium chloride and the product isolated by methanol precipitation followed by methanol washing. The resultant solid compound was filtered, dried under vacuum, dissolved in purified water, filtered through 0.45 μm followed by 0.22 μm membrane filters and lyophilized to obtain Dalteparin sodium with molecular weight distribution profile that met the pharmacopoeial requirements of weight average molecular weight (Table 1). Yield: 33.4 g.

Example 4

Heparin sodium (50 g) was dissolved in purified water and the pH of the solution was adjusted to 2-4 with hydrochloric acid at 5° C. to 10° C. Sodium nitrite solution (2.8%) was added to the reaction mass and stirred until negative by starch iodide paper. The pH was then adjusted to 8-10 with sodium hydroxide followed by the addition of sodium borohydride (1.5 eq.) and the reaction mass was held for 16 h. The resulting mixture was neutralised with hydrochloric acid, bleached with 30% hydrogen peroxide followed by saturation of the reaction mass with sodium chloride. The resulting mass was stirred with methanol, precipitated, filtered and dried to yield a precipitate of Dalteparin sodium.

The precipitated product (20 g) was dissolved in purified water and the solution was exposed to UV light (8 W) at 254 nm for 5 minutes. Further the reaction mass was further processed to by following the procedure described in example 3 to obtain Dalteparin sodium with molecular weight distribution profile that met the pharmacopoeial requirements of weight average molecular weight (Table 1). Yield: 21.6 g.

Example 5

Heparin sodium (250 g) was dissolved in purified water and the pH of the solution was adjusted to 2-3 with hydrochloric acid at 5° C. to 10° C. Sodium nitrite solution (3.0%) was added to reaction mass and stirred. The reaction mass pH was adjusted 9-10 with sodium hydroxide followed by the addition of sodium borohydride (2.0 eq.) and stirred for 1 hr. The reaction mass was filtered through carbon pad and washed with water. The pH of the reaction mass was adjusted 7.0 with hydrochloric acid and then 100 mL of 30% hydrogen peroxide was added to reaction mass and stirred for 30 minutes. Solid sodium chloride was added to the reaction mass and the product was precipitated with methanol. The resultant precipitate was filtered, washed with additional quantities methanol and dried under vacuo to obtain 138 g of crude Dalteparin sodium product as a white solid.

135 g of crude Dalteparin was dissolved in purified water at 25° C. to 30° C. Solid sodium chloride was added to reaction mass and the product was precipitated with methanol. The residue which was further stirred in water and alcohol mixture, filtered, washed with additional quantities of methanol and dried under vacuum to obtain 110 g precipitate of Dalteparin product as a white solid.

100 g of the obtained solid was dissolved in purified water and cooled to below room temperature. The solution was circulated through an integrated continuous flow reactor fitted with UV lamp of 254 nm wavelength and 8 W power for 40 sec and 60 sec through a peristaltic pump. After UV exposure, the reaction mass was treated with carbon and subjected to micron filtration. Alcohol was added to the resultant solution and stirred for 5 to 10 mins. The solution was loaded in Lyophilization trays and freeze dried comprising of: Initial freezing (−5° C. to −50° C., 3 to 11 h); primary drying (−50° C. to 25° C., 15 to 50 h, vacuum (220 to 90 mTorr) and secondary drying (25 to 40 ° C., 2 to 5 h, 220 to 90 mTorr vacuum). Yield: 90 g.

TABLE 1

Molecular weight distribution and weight average molecular weight for the Dalteparin European Pharmacopoeia (Ph. Eur) and Dalteparin sodium prepared in examples 1-5

| Product | Dalteparin (Ph. Eur) | Example 1 | Example 2 | Example 3 | Example 4 | Example 5 |
|---|---|---|---|---|---|---|
| Average Mw (Da) | 5600-6400 | 6808 | 5490 | 5943 | 6110 | 5900 |
| % MW < 3,000 Da | NMT 13 | 8.4 | 13.0 | 11.4 | 10.2 | 11.1 |
| % MW > 8,000 Da | 15-25 | 29.0 | 14.5 | 19.8 | 21.4 | 18.5 |

The molecular weight distribution is determined by Gel Permeation Chromatography (GPC). The results from the Table 1 demonstrate that the depolymerization process of the present invention using 2.5-3.1% sodium nitrite solution met the Ph. Eur molecular weight distribution profile.

TABLE 2

Variation in Boron content with different quantities of sodium borohydride used in depolymerization of heparin sodium before and after solvent mixture treatment (Examples 3-5)

| | | Boron content (ppm) | |
|---|---|---|---|
| Example | NaBH$_4$ (eq.) | Before | After |
| 3 | 4.23 eq | 12 to 16 | 2 to 3 |
| 5 | 2.0 eq | 7 to 12 | 0.3 to 0.6 |
| 4 | 1.5 eq | 3 to 5 | 0.3 to 0.5 |

As evident from the Table 2, the reduction process of the present invention i.e., by using 1.5 to 2.0 mole equivalents enables the preparation of Dalteparin sodium having boron content lower than 1 ppm (Ph. Eur).

TABLE 3

Variation in N—NO content in Dalteparin sodium with changes in the UV lamp power and exposure time

| S.No. | UV experimental conditions | N—NO content (ppm) |
|---|---|---|
| 1. | Fragmin ® | 10-18.2 |
| 2. | Without UV exposure (Example 1) | 21.1 |
| 3. | UV (4 W lamp) exposure for 5 min (Example 3) | 11.9 |
| 4. | UV (8 W lamp) exposure for 5 min (Example 4) | 9.7 |
| 5. | UV (8 W) exposure for 40 sec (Example 5) | <2.0 |
| 6. | UV (8 W) exposure for 60 sec (Example 5) | <1.0 |

As mentioned in Table 3, the preparation of Dalteparin sodium in accordance with the present invention results in a product with N—NO content which is lower than that determined for Fragmin® and the sample without UV irradiation.

The invention claimed is:
1. An improved process for preparing Dalteparin sodium, comprising:
  (a) depolymerising heparin sodium with 2.5 to 3.5% by weight sodium nitrite in the presence of an acid to generate a product,
  (b) reducing the product with 2.0 mole equivalents or less of a reducing agent to the weight of heparin sodium, to obtain crude Dalteparin sodium,
  (c) isolating the crude Dalteparin sodium,
  (d) stirring the crude Dalteparin sodium in a solvent mixture to obtain a precipitate of Dalteparin sodium,
  (e) dissolving the Dalteparin sodium precipitate in water to generate a solution and subjecting the solution to ultra-violet irradiation at 254 nm wavelength and 4 to 40 W power for a time period of between 10 seconds and 60 seconds, and (f) lyophilizing the solution in presence of alcohol to obtain Dalteparin sodium in free powder form.

2. The process of claim 1, wherein the depolymerisation of step (a) is carried out at a pH in a pH range of 2.0 to 4.0.

3. The process of claim 1, wherein the acid is hydrochloric acid, acetic acid or sulphuric acid.

4. The process of claim 1, wherein the reducing agent is sodium borohydride, potassium borohydride, or lithium borohydride.

5. The process of claim 1, wherein the reduction of step (b) is carried out at room temperature for a period of about 1.0 to 3.0 hours.

6. The process of claim 1, wherein the lyophilization of step (f) is carried out by adding alcohol to the solution of Dalteparin sodium obtained in step (e).

7. The process of claim 6, wherein the alcohol is at a concentration of 5 to 15% by volume relative to the water used in step (e).

8. The process of claim 7, wherein the alcohol is ethanol.

9. An improved process for preparing Dalteparin sodium, comprising:
   (a) depolymerizing an aqueous solution of heparin sodium with 2.5 to 3.5% by weight sodium nitrite in the presence of hydrochloric acid at a pH of 2 to 4 and at a temperature of 5 to 10° C. to generate a product,
   (b) reducing the product with 1.5 to 2.0 equivalents of sodium borohydride to the weight of heparin sodium, to obtain crude Dalteparin sodium,
   (c) isolating the crude Dalteparin sodium,
   (d) stirring the crude Dalteparin sodium in a solvent mixture to obtain a precipitate of Dalteparin sodium,
   (e) dissolving the Dalteparin sodium precipitate in water to generate a solution and subjecting the solution to ultra-violet irradiation at 254 nm wavelength and 4 to 40 W power for a time period of between 10 seconds and 60 seconds, and
   (f) lyophilizing the solution in presence of alcohol to obtain Dalteparin sodium in pure powder form and with N—NO content within limits.

10. An improved process for preparing Dalteparin sodium, comprising:
   (a) depolymerising an aqueous solution of heparin sodium with aqueous sodium nitrite solution of 2.5 to 3.1% by weight relative to heparin sodium in the presence of hydrochloric acid at a pH of 2 to 4 and at a temperature of 5 to 10° C. to generate a product,
   (b) reducing the product with 1.5 to 2.0 equivalents of sodium borohydride to the weight of heparin sodium, to obtain crude Dalteparin sodium,
   (c) isolating the crude Dalteparin sodium,
   (d) stirring the crude Dalteparin sodium in a solvent mixture to obtain a precipitate of Dalteparin sodium,
   (e) dissolving the Dalteparin sodium precipitate in water to generate a solution and subjecting the solution to ultra-violet irradiation at 254 nm wavelength and 4 to 40 W power for a time period of between 10 seconds and 60 seconds, and
   (f) lyophilizing the solution in presence of alcohol to obtain of Dalteparin sodium in free powder form,
   wherein the process does not involve any chromatographic purification step.

11. The process of claim 1, wherein the UV irradiation is carried out in a continuous photochemical reactor integrated with one or more UV lamps.

* * * * *